N. F. GARBO.
AUDITOR'S COMBINATION REPORT.
APPLICATION FILED SEPT. 17, 1900.

965,703.

Patented July 26, 1910.

WITNESSES.

INVENTOR
NILS F GARBO
BY Paul O Hawley
HIS ATTORNEYS.

UNITED STATES PATENT OFFICE.

NILS F. GARBO, OF MINNEAPOLIS, MINNESOTA.

AUDITOR'S COMBINATION-REPORT.

965,703.   Specification of Letters Patent.   Patented July 26, 1910.

Application filed September 17, 1900. Serial No. 30,254.

*To all whom it may concern:*

Be it known that I, NILS F. GARBO, of the city of Minneapolis, county of Hennepin, State of Minnesota, have invented certain new and useful Improvements in Auditors' Combination-Reports, of which the following is a specification.

My invention relates to means whereby the collation of facts and statistics relative to the sales of a large number of individual clerks' checks, handled by a large number of cashiers, and business done by a number of sections or departments in large stores, may be more quickly, accurately and easily accomplished, and all the major and minor details of a day's transactions presented in comprehensive and compact form, whereby thorough comparison and checking is made possible. Under existing practices, the various auditors' reports that are required for the business of a large store, occupy many different book pages or sheets for each day, and these reports are quite distinct from one another, must be compiled separately, and are with difficulty and only at great expense made to check or balance.

It is of great importance, where large numbers of clerks are employed, that the proprietor or manager should have at the earliest possible moment accurate figures to show the comparative work of the clerks, the honesty of the cashiers, and the general run of the business throughout the various departments and sections, the latter being the barometer of business by which future purchases and the pushing of certain lines of goods are controlled. In large department stores it has been practically impossible to make the cashier's account agree with sales by departments, the last being particularly true whenever the practice is to allow clerks to make sales in different departments under the same sales number. It is very important, not only that the management of a large establishment have exact figures showing relative sales by departments, in order that expenses and purchases may be properly proportioned and determined upon, but that such figures be at hand at as early an hour as possible after the close of each day's business. This latter is impossible when it is necessary for the auditor to duplicate or triplicate the record of the sales checks.

The object of my invention is primarily to do away with the so-called recapitulation sheet, used especially in large department stores and which requires a great deal of time in its preparation; and a further object of my invention is to provide means whereby the work of preparing the statement may be begun as soon as any part of the sales checks from the clerks and cashiers have been assorted, so that the work may be kept up during the day with the result that a statement of business may be perfected soon after the closing of the doors each evening; and a further object of my invention is to provide means whereby the various reports which now involve so much work and trouble may be made in compact form upon a single sheet or series of sheets whereon each sale appears but once, while results are given showing individual and total receipts by cashiers, total charges or sales on account, total credits, total receipts and sales by departments, and the total sales of each clerk.

My invention requires but a single entry of each transaction, the sales or transactions being arranged according to departments as well as to clerks' numbers, and in such a manner that the cashiers' accounts are kept separately from one another and from charges and credits.

My invention will be more readily understood by reference to the accompanying drawing, forming a part of this specification and which is a face view of the report, and wherein—

A—A—A—A—A represent cashiers' sheets, B a charge and total sheet, and C a credit and total sheet. It will be noticed that these sheets, while they are all of the same length, are of different widths or height. Each sheet is ruled vertically, making a large number of individual clerks' columns D—D—D, and also a wide column E at the right hand end of the sheets. The sheets are of such length that there are enough of the columns D for several departments, and the number of departments appearing upon a single section or set of sheets depends upon the amount of work that a single auditor's assistant is able to do during the day. The departments are distinguished by heavy additional vertical lines F, which are usually ruled in pencil or ink at the time the sheets are to be used. The reason for this is that the number of clerks in any department varies from time to time. This feature of freedom from arbitrary rulings or divisions for departments is a feature of my invention. The whole sheet is spaced off into clerks' columns of equal width, and the department line may be ruled in at any point. It is obvious that in a large establishment a number of sets or sections of these sheets will be required, with substantially an equal number of auditor's assistants. But this number is greatly less than the number of assistants required where other auditing systems are in use.

The sheets are arranged one upon the other, and are either pinned, bound or stuck together. When desired, the sheets may be separated, so that several persons may work thereon, each being furnished with sales slips or checks from a corresponding cashier or department. It is, however, seldom necessary to thus separate the sheets except in the case of a special sale in some one department and when several cashiers are kept busy with checks from such department.

The several sheets A—B—C are placed one upon the other, the upper sheet being narrower than the one below it, and so on to the last sheet. Each cashier's sheet A is provided with two footing lines G—H which extend the full length of the sheets. In addition to the lines G—H the last cashier's sheet is provided with the third line I. The charge sheet B is identical with the last cashier's sheet so far as the lines G—H—I are concerned. The bottom sheet is provided with lines G—H and also has lines J—K. Below these lines the bottom sheet is provided with spaces L and M to receive the numbers or names of the clerks and of the departments. At the left-hand end of the sheet is a wide column N wherein the descriptions are written or printed upon the footing lines of the several sheets.

The use and operation of my invention is as follows: As soon as the store is opened in the morning the cashiers begin to receive checks from the clerks. These checks are bundled together from time to time during the day and are taken to the auditing room. As soon as the checks begin to come in, the auditors sort the same according to departments, and as there are very few departments compared with the number of clerks the sorting of checks is quickly done. The sorted checks are given to the auditors according to the sets or sections of record sheets held by them. The work of making up the combined record may then proceed immediately, the auditors transferring the amounts from the sales slips to the proper sales column and cashiers' sheets, or charge or credit sheets, as fast as the checks or sales slips come in. As a usual thing, the auditor will, before beginning to put down the amounts from the slips, run through the slips and transfer the clerks' numbers to the spaces L, and will also put down the number or name of the department at the foot of the bottom sheet. In setting off the space for a department the auditor usually leaves a number of spare columns D to receive the numbers and sales of clerks who may be transferred to the department at any time during the day. At the close of the day's business all of the items in each department and upon each cashier's sheet are added together and the total is placed in the space X on the line H in each instance. These are the total cash sales, credits and charges, and appear at the lower right-hand corners of the several figured department spaces upon the cashiers' sheets. As before explained, there are several departments represented upon each cashier's sheet, and these totals are footed horizontally on the lines H and into the columns E of each cashier's sheet. If there is a discrepancy in any cashier's account, it may be quickly found by checking over the particular sheet belonging to such cashier. The footings upon the "charges" and "credits" sheets B and C are treated in a like manner and must balance with the account in the general office. After the cash is balanced the department totals X upon the several sheets are footed vertically and the totals of sums upon sheets A—A—B for each department are footed upon the line I of sheet B, showing the total sales for each department, and these, when footed horizontally upon the line I, show the grand total of sales for all the departments appearing upon the particular set or section, such totals being in the column E. The total credits for each department, appearing in the spaces X, sheet C, are then subtracted from the sum at the bottom of sheet B and set down upon the line K, sheet C. The figures on the line K are then footed horizontally into the column E, showing the net sales for all the departments. After these steps have been performed, each clerk's column D is footed, the totals appearing upon each cashier's sheet, line G. The clerks' totals upon all the sheets will then be footed down upon the line I upon the last cashier's sheet, after which the charges appearing upon sheet B will be added to the totals on the line I and footed on line I of sheet B, following which the credit totals of clerks will be footed on line G of sheet C, then subtracted from the totals on line I of sheet B, the remainder being footed on line J of sheet C. The cross-footings of clerks' totals correspond to the cross-footings for cashiers' credits and charges. When a number of sections of my sheets are used, the totals in the columns E thereof may be transferred to a special summary, or may be added upon any of the sections.

The principal work connected with my combined record is in transferring the detail amounts of sales. This work may be carried on throughout the day, and the summarization of the report occupies but little time, so that the report may always be completed and ready at an early hour in the evening.

Having thus described my invention, I claim as new and desire to secure by Letters Patent:

1. An auditor's combined report, comprising cashiers' sheets A—A, each having footing lines G—H and one sheet having a footing line I, charge and credit sheets B and C, the former having footing lines G—H—I, and the latter lines G—H and also lines J—K, said cashiers' and charge and credit sheets being each of different width from top to bottom whereby their respective footing lines will be exposed when the sheets are placed one upon another, and said sheets also having vertical rulings and divided also vertically by heavy vertical lines into groups, and also having vertical descriptive columns and similar columns for the horizontal totals, substantially as described.

2. An auditor's combined report, comprising cashiers' sheets A—A, each having footing lines G—H and one sheet having a footing line I, charge and credit sheets B and C, the former having footing lines G—H—I and the latter lines G—H and J—K, and also having spaces L and M below said footing lines, said cashiers' and charge and credit sheets being each of different width from top to bottom whereby their respective footing lines and the spaces L and M will be exposed when the sheets are placed one upon another, and said sheets having vertical rulings and divided also by heavy ruled lines into groups of columns, and said sheets also having vertical left-hand descriptive columns and similar right-hand columns for the horizontal totals.

3. An auditor's combined report comprising a series of sheets placed one upon the other with their upper edges even with one another, said sheets being of the same length horizontally and having a series of horizontal rulings but being of different widths from top to bottom, and each having two footing lines exposed at the bottom of the sheet, and some of said sheets having additional footing lines, and all of said sheets being provided with a series of vertical rulings dividing them into vertical columns designated respectively for the different clerks, and said vertical columns being divided at intervals by vertical rulings into sections, substantially as described.

In witness whereof I have hereunto subscribed my name this 11th day of September, 1900.

NILS F. GARBO.

In the presence of—
C. G. HAWLEY,
M. E. GOOLEY.